April 29, 1930. W. J. GAMBLE ET AL 1,756,737
HEATER
Filed Dec. 31, 1927 4 Sheets-Sheet 1

INVENTOR
William John Gamble,
Alfred E. Stacey Jr
and William B. Thornton
by Parker & Prochnow
ATTORNEYS

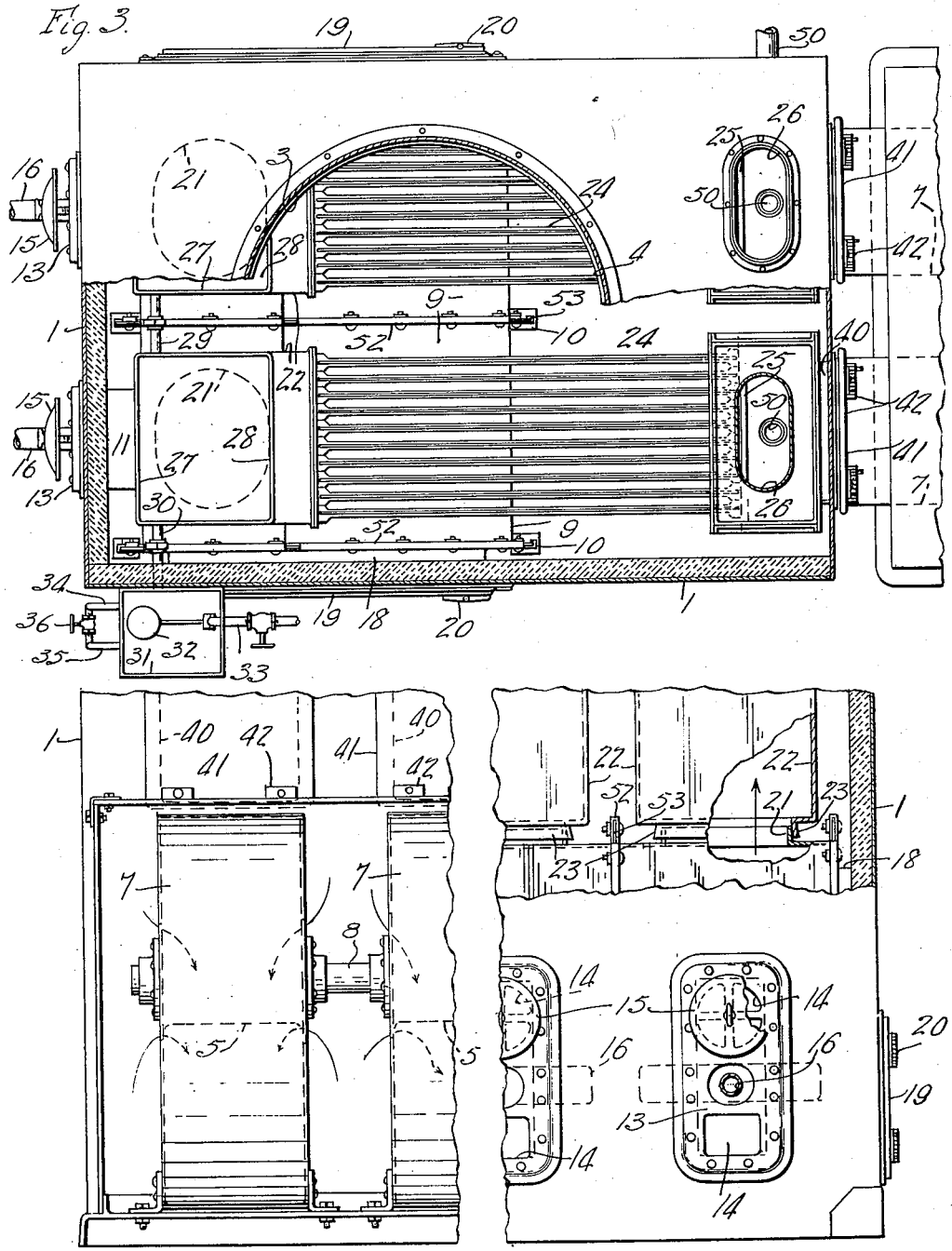

April 29, 1930. W. J. GAMBLE ET AL 1,756,737
HEATER
Filed Dec. 31, 1927 4 Sheets-Sheet 3
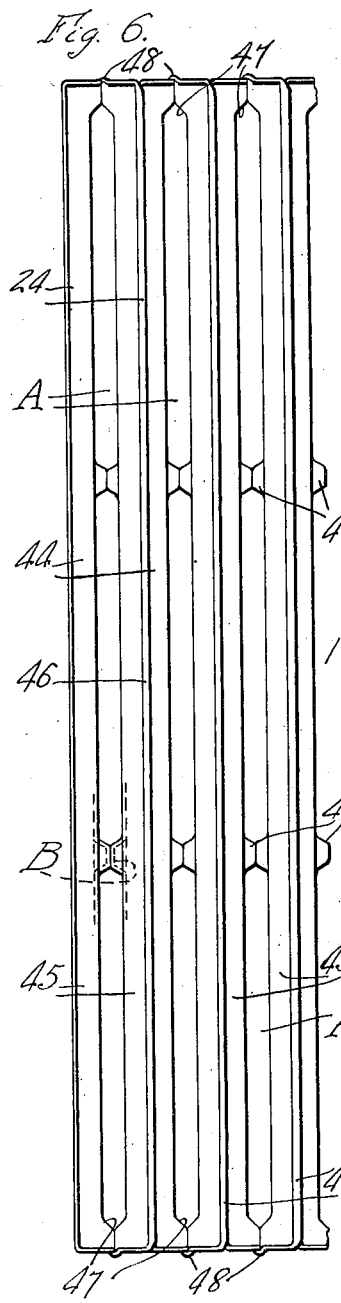
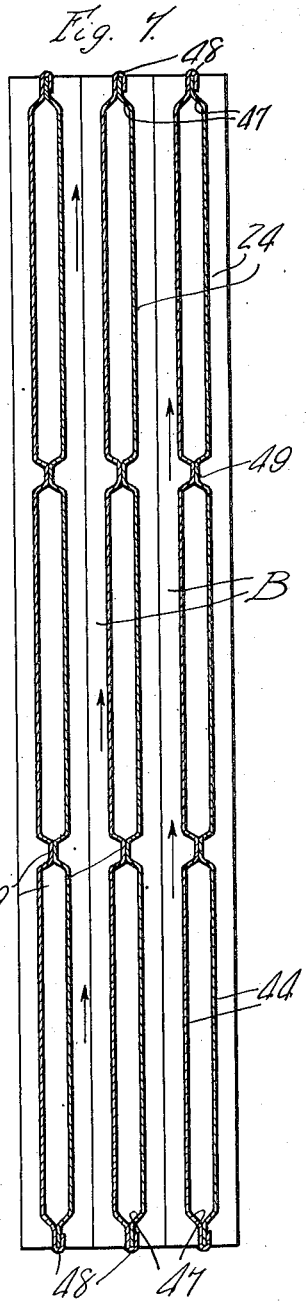
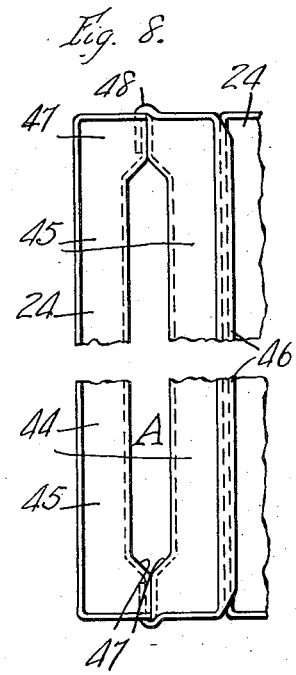

April 29, 1930.　　W. J. GAMBLE ET AL　　1,756,737
HEATER
Filed Dec. 31, 1927　　4 Sheets-Sheet 4
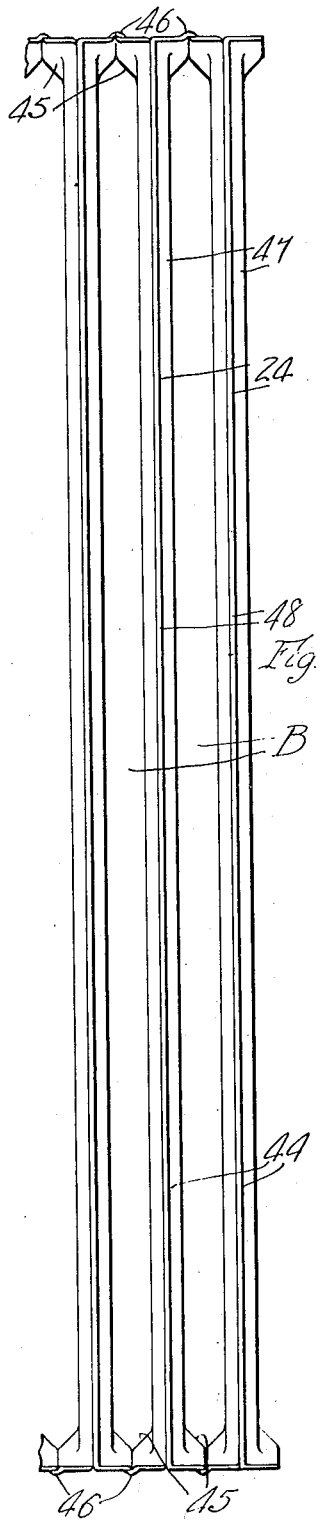
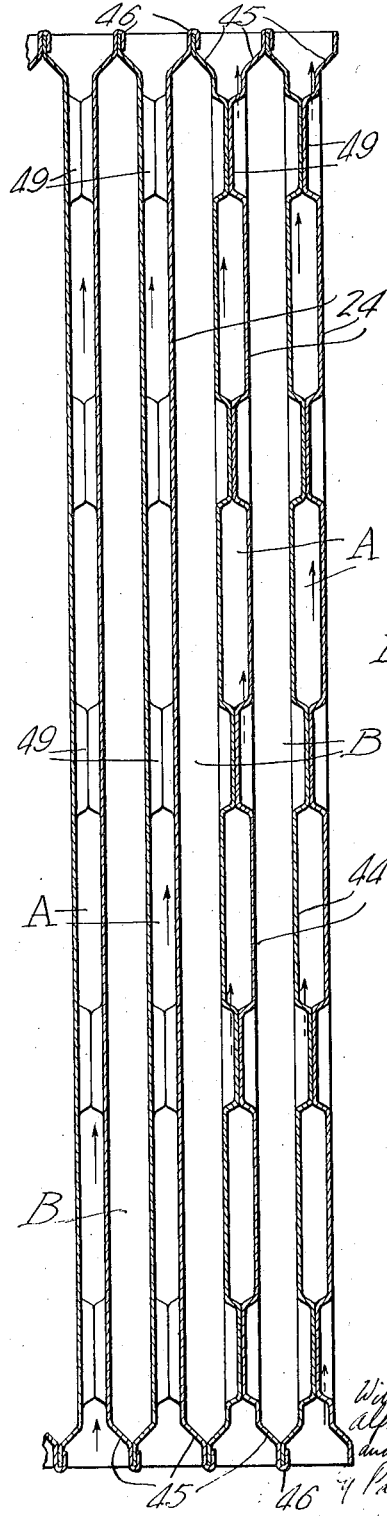

Patented Apr. 29, 1930

1,756,737

UNITED STATES PATENT OFFICE

WILLIAM JOHN GAMBLE, OF ALLENTOWN, PENNSYLVANIA, AND ALFRED E. STACEY, JR., OF CALDWELL, AND WILLIAM B. THORNTON, OF NEWARK, NEW JERSEY, ASSIGNORS TO CARRIER ENGINEERING CORPORATION, OF NEWARK, NEW JERSEY

HEATER

Application filed December 31, 1927. Serial No. 243,972.

This invention relates to heaters, and particularly to air heaters of the type utilizing liquid or gaseous fuel. Liquid and gaseous fuel have not come into extensive general use for heating purposes for various reasons, one of the main reasons being that the cost of such fuel for the ordinary or usual types of heaters or heating plants is relatively high, owing to the low efficiency of such plants. Trouble has also been experienced with prior types of heating plants adapted for such fuels, owing to the fact that some of the products of combustion condense in the heat exchanging section of the plant, drain back towards the combustion chamber and revaporize, return to the heat exchanging part of the plant, recondense, return to the combustion chamber, revaporize, etc., until the condensed products of combustion become highly concentrated with substances injurious to the material of which the plant was built. For example, the gases of combustion frequently contain sulphur dioxide and carbon dioxide which unite with condensed moisture and form acids destructive to metals. These acids are concentrated by the continued condensation and revaporization until they attack and destroy the metal of which such heaters or plants are usually built. Heretofore, the use of sheet metal for such heaters or plants has also been unsatisfactory, because the construction did not permit of expansion and contraction without injury of the sheet metal. The thin metal was quickly destroyed by the concentrated acids, the insulation of such a plant offered considerable difficulty, and there was considerable danger of injury to the plant by internal explosion of the fuel.

An object of this invention is to generally improve and simplify heaters.

Another object of the invention is to provide an improved heater which may be utilized advantageously with either liquid or gaseous fuel; which may be formed largely of sheet metal with which expansion and contraction is provided for without danger of injury to the structure of the heater; with which injury to the heater by condensation of the products of combustion is effectively avoided; with which danger of injury due to internal explosions is avoided; and with which proper insulation is obtained in a simple and inexpensive manner.

A further object of the invention is to provide an improved heater of the hot air type; with which moisture may be added to the heated air in a simple and dependable manner under various operating conditions; with which the amount of moisture added to the air may be varied selectively; and with which the supply of moisture may be automatically maintained.

A further object of the invention is to provide an improved heater which may be formed largely of units which may be assembled in numbers sufficient to provide any desired heating capacity; which may be effectively and efficiently operated at partial or full capacity; and which will be relatively simple, practical, durable, compact, efficient and inexpensive.

Various other objects and advantages will be apparent from the following description of an embodiment of the invention, and the novel features will be particularly pointed out hereinafter in the appended claims.

In the accompanying drawings:—

Fig. 3 is a plan partly in section of the same;

Fig. 4 is a partial front elevation of the same, with portions broken away to show the interior;

Fig. 5 is a rear elevation of a portion of the same, and illustrating the relation thereto of the blower apparatus;

Fig. 6 is an end elevation of the heat exchanging unit as viewed along the line 6—6 of Fig. 1;

Fig. 7 is a sectional elevation of the same, with the section taken approximately along the line 7—7 of Fig. 1;

Fig. 8 is an elevation, on a larger scale, of the end portions of the heat exchanging unit shown in Fig. 6;

Fig. 9 is a top plan of the heat exchanging unit as viewed from approximately the line 9—9 in Fig. 1; and Fig. 10 is a sectional plan of a heat exchange unit, with the section taken approximately along the line 10—10 of Fig. 1.

Figure 1:
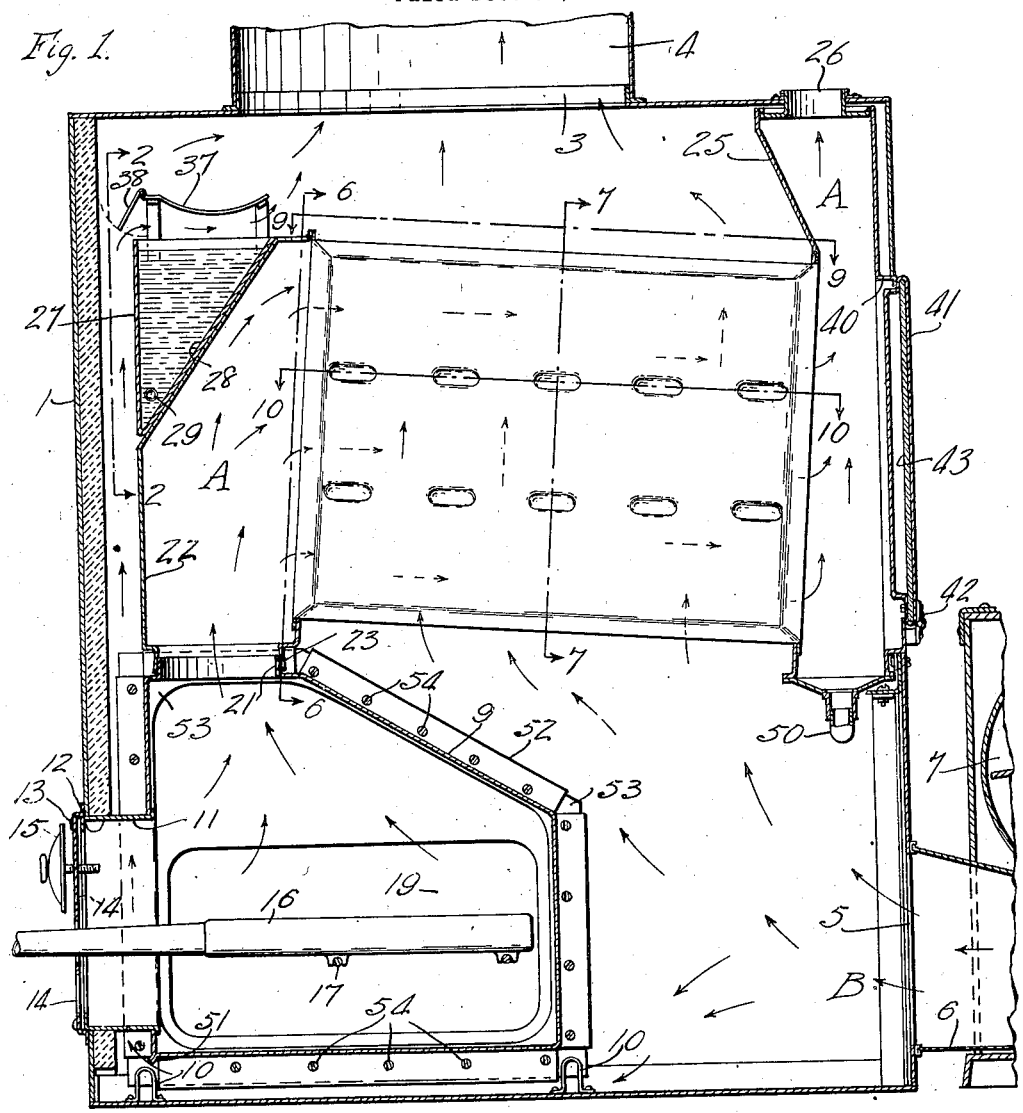
Fig. 1 is a sectional elevation of a heater of the hot air type constructed in accordance with this invention.

In the illustrated embodiment of the invention, the heater is of the two unit type, but it will be understood that it may be formed of one or any number of units in order to have any desired heating capacity. The heater includes a casing 1 of suitable material such as transite board, and may be insulated along its inner surface by suitable heat resisting material. For convenience, this casing 1 may be boxlike in shape and provided in its top wall with an outlet opening 3 to which a distributing conduit 4 may be connected for conveying heated air from the casing to any desired distributing point. The cold air from any suitable source such as fresh outside air or air withdrawn from a room may be supplied to the casing at the lower part thereof, through one or more openings 5. Any suitable means for introducing the air may be employed, such as by conducting air to the openings 5 by suitable conduits 6 leading from circulating devices 7, Figs. 1, 3 and 5, and I have found that a plurality of blowers having their rotatable elements mounted on a common shaft 8 and operated from a common power device or motor (not shown) provide a satisfactory circulation of the air.

One or more fire box units 9 forming a combustion box may be disposed in the casing adjacent the lower front portion thereof, said units 9 being spaced largely from the walls of the casing and supported in any suitable manner such as by brackets or feet 10. A conduit 11 (Fig. 1) extends from the front wall of each fire box through an aperture 12 in the front wall of the casing, and the forward or outer end of this conduit 11 is closed by a removable plate 13 having suitable draft openings 14 (Fig. 4), some or all of which are controlled by adjustable closure elements 15, whereby the amount of air allowed to enter the fire box may be selectively controlled. A burner 16 (Fig. 1), either of the liquid or gaseous type, may project through each closure plate 13 and extend through the conduit 11 into the interior of the fire box unit for supplying fuel thereto. This burner may be supported within its fire box unit in any suitable manner, such as by rods 17 extending across the interior of each unit.

The fire box units are disposed side by side in the front portion of the casing 1, with abutting sides connected together and communicating with one another. The ends of the fire boxes at the ends of the row have connected thereto conduit extensions 18 (Fig. 3) projecting through the side walls of the casing 1, the openings through the casing 1 being yieldingly closed against the casing 1 by suitable doors 19 hinged to the conduit extensions by suitable spring actuated hinges 20. The doors 19 serve as explosion doors, in that whenever an explosion occurs within the fire box, the doors open outwardly automatically to relieve the pressure in the fire box and thus prevent injury to the interior of the heater, the doors closing themselves automatically when the internal pressure in the units falls.

The upper wall of each fire box unit is provided with an upwardly extending tubular portion 21 (Figs. 1 and 4). A header 22 is disposed above each fire box unit and provided with a depending tubular flange 23 which telescopes with and seats upon the adjacent extension 21, so as to provide a relatively tight connection between the fire box and the header. To insure that the closure will be tight, the depending flange 23 may be slightly convergent or tapered as to tightly seat upon or fit the extension 21. The rear face of the header 22 is fitted and secured to one end of a heat exchange unit 24, and the other end of this exchange unit is fitted to the forward face of another header 25 which is supported at the rear of the casing 1 from the base or floor thereof, such as by an angle frame (not shown) resting upon the base or floor of the casing. The upper end of the header 25 is provided with an upwardly extending flue connector or conduit 26 (Fig. 1) for connection with a common chimney flue, through which products of combustion reaching the header 25 through the unit 24 and header 22 may be discharged as usual in heaters.

It will be observed that the heat exchange unit 24 is supported only at its ends and by the headers 22 and 25, the header 22 being supported in turn at its lower end upon the fire box unit, and the heater 24 being slidable forwardly and rearwardly upon its support. Thus as the heat exchange unit 24 expands and contracts by heat changes, the rear end may move slightly forwardly and rearwardly to adjust itself to the slightly varying size of the unit. A separate header 22, a heat exchange unit 24, and a header 25 may be provided for each fire box unit, and the flue connector or conduit 26 for each header 25 may be connected to one another, usually exteriorly of the casing, in order that a common exhaust flue or chimney may be utilized for the gases coming from all of the heat exchange units. The headers 22 and 25 and the unit 24 associated with each fire box unit together act, and may be described, as a heating device, and these heating devices will be spaced apart in the casing somewhat, so that air in the casing may circulate around all sides of them.

Figure 2:
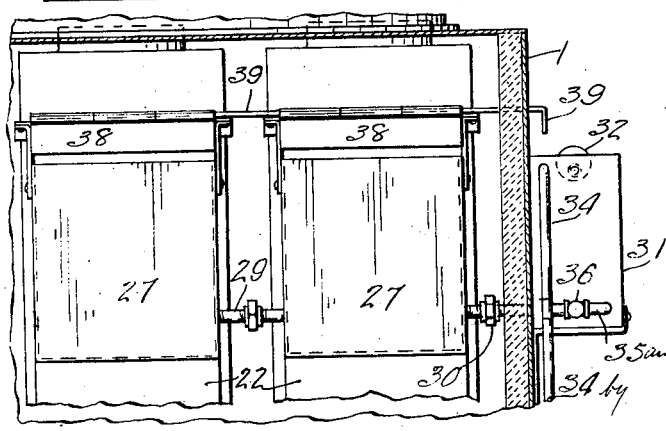
Fig. 2 is a sectional elevation of a portion of the same, with the section taken approximately along the line 2—2 of Fig. 1.

In order to supply moisture to the air circulated through the casing, a water pan 27 (Figs. 1, 2 and 3) may be associated with each header 22, by being located or mounted in close proximity thereto, so that some heat from each header 22 will be transferred to the related pan in order to heat the contents thereof and keep them close to the vaporizing temperature. To insure an effective heat transfer to the pan, advantage is taken of the fact that the gases of combustion entering the header 22 will be moving vertically and must be deflected into an approximately horizontal direction in order to enter the heat exchange unit 24. For this purpose, the upper end wall of the header 22, or a considerable portion thereof, may be made inclined, as indicated in Fig. 1, in order to deflect the upwardly moving gases of combustion into the unit 24, and consequently this oblique wall of the header will be struck by the hot gases and heated to a high temperature. The pan 27 is provided with an oblique wall 28 which fits in close proximity to or in contact with the oblique wall of the header, the inclination of the wall 28 of the pan and the oblique wall of the header being preferably approximately the same. In this manner the inclined wall of the pan will be effectively heated through the oblique wall of the header, and consequently the contents of the pan will be heated to a temperature often closely approximating the vaporization point.

The pans 27 may be connected together adjacent their lower ends by suitable pipes 29, and one of the end pans 27 may be similarly connected by pipe 30 to a reservoir or supply tank 31 which preferably is located exteriorly of the casing 1. If the reservoir 31 is kept filled with water, the water will flow through the pipe 30 to the first pan 27 and through it to the other pans. Thus the water in all the pans will automatically assume the level of that in the reservoir 31. A suitable float valve 32 may be provided in the reservoir 31, (Figs. 2 and 3), for controlling the flow of water from a supply pipe 33 into the reservoir 31, so as to maintain a constant water level therein. If desired, the reservoir 31 may have an overflow pipe 34 extending from the upper part thereof, and a drain pipe 35 controlled by a valve 36 may extend from the lower part of the tank 31 to this overflow pipe 34.

A deflector plate 37 may be mounted in any suitable manner upon and above each pan 27, as indicated clearly in Fig. 1, this deflector plate preferably having its under surface convex. To one end of each deflector plate 37 a wing or movable deflector plate 38 may be mounted, such as by hinges, so as to be adjustable to various extents beyond a side wall of its related pan 27, as indicated by the dash lines in Fig. 1. The deflector plates 38 may have frictional hinges, so that they will remain in different angular positions into which they may be adjusted, but all of the plates 38 are preferably secured to a common pivot rod 39 (Fig. 2) which extends to the exterior of the casing, so as to be accessible for manual operation, and thus the plates 38 may all be angularly adjusted concomitantly so as to project to various extents beyond the side or lateral limits of the pan and into the path of a portion of the rising air in the casing. These plates or wings 38 thus deflect over the pans, a portion of the rising column of air in the casing, and the air thus deflected over the pans will in turn be again downwardly deflected by the convex faces of the plates 37 into contact with the liquid in the pans, and thus will take up considerable moisture from the liquid while passing thereover.

Each header 25 may have a rearward tubular extension or conduit portion 40 (Fig. 1) opening through the rear wall of the casing, which portion or extension is normally closed by a door 41 connected to the tubular extension 40 by suitable spring hinges 42 which yieldingly hold the doors in closed position, but which permit outward movement of any door when the pressure in that related header 25 becomes materially greater than the pressure exteriorly of the casing. These doors 41 are what may be called explosion doors to relieve the pressure in the heat exchange unit 24 and related headers, such as in the event of an explosion of gas therein, this release of pressure preventing injury to the heat exchange units. These doors 41 also serve as clean out and inspection doors. Each door 41 may be double walled and provided interiorly with a filler or lining 43 of insulation material such as transite board.

The heat exchange units 24 are preferably built from plate of sheet metal separately from the headers 22 and 25, and then subsequently attached thereto. The construction of the units 24 is illustrated in detail in Figs. 6 to 10. The sheet metal used for the plates of these units is one which will be as resistant as possible to the corrosive or destructive action of the gases of combustion, and these sheets are arranged face to face in somewhat spaced relation to one another so as to form flues between them. The forward end edges of these plates 44 are offset as at 45, so that adjacent end edges abut one another side by side in pairs, the abutting edges being connected together in any suitable manner, such as by turning a flange 46 provided on the edge of one plate over the adjacent abutting edge of the other plate of that pair, as shown clearly in Figs. 6 and 7, thus locking these two plates together by a seam. The rear end edges of the same pairs are similarly connected, and by such connections of the edges of the plates to one another in pairs, the spaces between the adjacent plates which are unconnected to one another at their forward and rearward edges constitute gas flues A passing approximately horizontally between the headers 22 and 25, and are separate from the other flues B between the adjacent plates which are connected to one another in pairs at their forward and rearward edges.

The top and bottom edges of the plates 44 are similarly offset as at 47, so as to abut one another in pairs, the abutting edges of the pairs being connected to one another such as by turning a flange 48 provided upon one edge of each abutting pair over the other plate of that pair, as shown clearly in Figs. 6 and 9. The pairs of plates which are connected at the top and bottom edges of the plates 44 are different, however, than the pairs which are connected at their forward and rearward ends, that is, each plate 44 is connected at its forward and rearward end with the adjacent end of the plate at one side thereof and then its top and bottom edges are connected to the plate at the other side thereof. This connection of the plates in pairs in this manner divides the flues of the exchange unit 24 into two groups which extend crosswise of one another, one group comprising flues A being approximately horizontal and connecting the headers 22 and 25, and the other group comprising flues B extending vertically so as to permit the passage upwardly therethrough of the air rising in the interior of the casing. The flues A for the gases of combustion, in cross section will be vertically long and horizontally narrow, and the vertical air flues B in cross section will be relatively long and narrow. The columns of fluids in the flues of both groups will be in relatively thin sheets separated by sheet metal, and consequently the rate of heat transfer between the same will be a maximum. The headers 22 and 25 are approximately vertical, and the hot gases of combustion enter the header 22 upwardly in a direction axially of the header. The outlet opening of the header 25 is at the end opposite from the inlet end of the header 22, so that the length of travel and resistance to fluid travel between the inlet of header 22 and the outlet 26 of header 25 will be approximately the same, whether the gases pass through the upper or lower portions of the vertically elongated flues A. Since the gases will thus be equally distributed in the flues A as they pass through the exchange unit, the maximum efficiency of heat exchange with the gases can be obtained.

Each plate 44 may have one or more protuberances 49 drawn therefrom without breakage of the continuity of the plate, and these protuberances are so drawn and located as to extend toward one another in one group of flues, such as the horizontal group, as shown clearly in Figs. 6 and 7. These protuberances may be merely round protuberances, or they may be somewhat elongated, like corrugations, and are of such heights as to abut one another when the plates are assembled in the manner hereinabove described, as will be evident from Figs. 6 and 7. These protuberances which abut endwise against one another are preferably secured together such as by spot or electric pressure welding of the abutting ends of the same, this connection to one another of the protuberances preventing separation of the plates forming each horizontal flue, and thus in the event of high pressure in these horizontal flues, such as might be caused by an explosion therein, the walls forming these flues will not buckle or materially separate and take a set while in flexed conditions.

The plates 44 comprising each unit 24 are preferably approximately rectangular in shape, and the headers 22 and 25, and the heat exchange units are so positioned that the flues of the exchange unit 24 extending between the headers will be inclined downwardly and rearwardly to some extent, as shown clearly in Fig. 1. Because of this inclination of the flues in the unit 24, any condensation of the products of combustion which may occur in these flues of the exchange unit 24 will drain to the rear of the casing 1, that is, in the direction of travel of the gases through these flues. The condensate will thus drain into the bottom of each header 25 as rapidly as formed, and a pipe 50, Fig. 1, may connect the bottom of each header 25 with the exterior of the casing, so as to convey out of the casing 1 all condensate as rapidly as formed. Thus the condensed products of combustion will not drain back into the fire box, revaporize and return to the exchange unit 24 repeatedly until concentration is reached, and instead the relatively weak condensate collecting in the headers 25 will be removed before it is strong enough to seriously injure the material of the heater.

Each fire box unit may be formed by bending a strip of sheet metal into the tubular form shown in cross section in Fig. 1, the ends being brought together at one corner slightly face to face to form an oblique flange 51, as shown at the lower left corner of the fire box in Fig. 1. These abutting edges forming flange 51 may be electrically tacked or spot welded together or otherwise connected such as by bolts. The side edges of this strip of sheet metal which has been bent into tubular form will be provided with outwardly turned flanges 52 which abut face to face with one another when the units are arranged side by side in the casing 1, and preferably a somewhat ring-like stiffening plate 53 of heavy metal is disposed between the abutting faces of the flanges 52, and the edges of one set of flanges 52 then turned over the plate and the edge of the other adjacent flange in order to lock them together. If desired, suitable screws or bolts may also be passed through the abutting flanges 52 and the interposed plate 53, so as to more effectively unite the fire box units to one another.

At the ends of the fire box units adjacent the side walls of the casing 1, the flanges 52 may be connected to the walls of the casing by the tubular extensions 18 having flanges similar to the flanges 52 and similarly connected thereto, as shown in Fig. 3. The upwardly extending tubular outlet 21 of each fire box unit is preferably provided adjacent the forward wall of the fire box unit and the upper surface of each fire box unit rearwardly of this outlet 21 is preferably downwardly inclined to some extent, to facilitate the movement of the gases of combustion into the header 22 and to provide clearance below the heat exchange unit 24, so that the air entering the casing will be free to move upwardly through the vertical flues in the exchange unit 24.

In the use of the heater constructed as herein described and illustrated, the current of air or fluid to be heated is introduced into the casing at points corresponding in number to the number of units forming the heater, such currents being introduced preferably through the back wall of the casing and directed forwardly towards the adjacent fire box unit which is largely spaced from the walls of the casing. The current of air thus introduced circulates around the fire box units and around the headers and heat exchange units 24, some of the air passing upwardly through the units 24, and all of the air leaving the casing through the distributing conduit 4.

A portion of the air rising along the header 22 of each exchange unit will be deflected over above the adjacent pan 27 by the adjustable wing or plate 38 related to that pan, and this deflected air will be further deflected downwardly against the liquid in the pan or tank 27 by the related convex plate 37. The portion of rising air so deflected will depend to some extent upon the size of the adjustable or hinged deflecting plate and the extent to which it projects beyond the side of the pan or tank 27. All of these wing plates may be adjusted together by the common operating rod 39 (see Fig. 2) or the plates 38 may be separately adjustable. The air which is deflected into contact with the liquid in the pans or tanks 37 will take up moisture from the liquid in the pans, and this moisture laden air will mix with the other air, the mixture leaving the heater through the distributing conduit 4.

Fuel is supplied to the burner 16 within each fire box, and the burners 16 in the fire boxes may be operated singly or concomitantly in groups as required in any instance. The openings 14 admit a certain percent of the air required for combustion, and the admission of further air is controlled by the adjustment of the shutter 15, so that the amount of air admitted may be regulated to avoid the admission of air greatly in excess of the requirements with consequent dilution and lowering of the temperature of the gases of combustion. The openings 14 may also be controlled by shutters if desired. The gases of combustion in the fire box rise through the tubular outlet 21 and ascend in the header 22, but are deflected by the latter into the approximately horizontal flues in the heat exchange unit 24. The gases leaving this unit 24 enter the header 25 and are discharged therefrom through the flue or chimney connection opening 26. Any condensation in the horizontal flues of the unit 24 will drain in the direction of travel of the gases of combustion into the header 25 and from the latter will be conducted out of the heater by the pipes 50.

The unit 24 and its connected headers are mounted in such a manner that the unit 24 can expand and contract, without breaking their connections to the other parts of the heater or injuring any of the parts such as by the buckling of the sheet metal of which the heater is largely formed. The air circulating around the fire box and headers and flues of the unit 24 will prevent undue heating of the outer walls of the casing, and heat otherwise lost by radiation from the casing 1 will be taken up by the circulating air and utilized to advantage, a portion of the heated air being supplied with moisture by the novel variable means provided in connection with each pan or tank.

The explosion doors 19 and 41 are so positioned that all danger of injury to the heater by internal explosions is effectively avoided, the doors automatically taking their closed position following each explosion or equalization of pressure in the heater. It will be observed that with this arrangement the number of burners used may be varied as conditions require at any time, and the same amount of air may be circulated continuously regardless of the number of burners operating, by which arrangement all of the air is circulated and humidified effectively independently of the degree of heat imparted to the circulating air, so that satisfactory air conditions may be obtained from this heater under all operating conditions.

Heaters constructed in accordance with this invention have been found to be exceptionally efficient, the gases of combustion entering the heat exchanger at a temperature of about 1700° or 1800° and leaving the same for the chimney at a temperature of about 150°.

It will be obvious that various changes in the details, which have been herein described and illustrated in order to explain the nature of the invention, may be made by those skilled in the art within the principle and scope of the invention as expressed in the appended claims.

We claim as our invention:

1. A heater comprising a unit formed of a plurality of sheet metal plates spaced from one another face to face to form flues, and having their adjacent end edges connected along their entire lengths to one another in pairs and their adjacent edges of both top and bottom along their entire lengths connected to one another also in pairs which are different from the first mentioned pairs, to divide the flues into separate non-communicating groups which extend in directions crosswise of one another, a header connected to said unit and communicating with one group of flues, at one end thereof, another header connected to the other end of said unit and communicating with the other end of said one group of flues, a fire box connected to the first mentioned header, a casing enclosing said headers, unit and fire box, and means for circulating a fluid to be heated, through said casing, around said headers and fire box, and through said other group of flues.

2. A heater comprising a unit formed of a plurality of sheet metal plates spaced from one another face to face to form flues, and having their adjacent end edges connected to one another in pairs and their adjacent edges of both top and bottom connected to one another also in pairs which are different from the first mentioned pairs, to divide the flues into separate groups which extend in directions crosswise of one another, a header connected to said unit and communicating with one group of flues at one end thereof, another header connected to the other end of said unit and communicting with the other end of said one group of flues, a fire box connected to the first mentioned header, a casing enclosing said headers, unit and firebox, and means for circulating a fluid to be heated through said casing, around said headers and fire box, and through said other group of flues, each of said plates having an unbroken protuberance drawn therefrom in a direction and to an extent such that when the plates are connected at their edges, the protuberances of adjacent connected plates will abut one another within one group of flues to space the walls of those flues against collapse, said protuberances having widths less than the flues into which they project so as to avoid closing those flues, and abutting protuberances being connected to one another to prevent their separation.

3. A heater comprising a heat exchange unit having separate groups of flues therein extending crosswise of one another, a header connected to one end of said unit for supporting the same and communicating with one group of flues thereof, a second header connected to the opposite end of a unit and communicating with said one group of flues, said second header having a supporting portion extending laterally of the flues with which it connects, means connected to the extension of said second header for supporting the same, and means for supplying a heated fluid to one of said headers and removing it from the other, whereby a heat exchange may be obtained with a fluid passing through the other group of flues.

4. A heater comprising a unit having separate groups of flues therein extending crosswise of one another, a combustion chamber, means connecting said combustion chamber to said unit for conveying gases of combustion to one end of one group of flues thereof, said unit being disposed with said one group of flues inclined downwardly from the end connected to said combustion chamber, a header connected to the other end of said unit and communicating with said one group of flues for receiving and conducting away from said unit the gases of combustion, said header having means for receiving and conveying away any condensation occurring in said one group of flues within said unit, and means by which a fluid may be circulated through the other group of flues to effect a heat exchange with the gases of combustion in said unit.

5. A heater comprising a unit having separate groups of flues therein extending crosswise of one another, a combustion chamber, means connecting said combustion chamber to said unit for conveying gases of combustion to one end of one group of flues thereof, said unit being disposed with said one group of flues inclined downwardly from the end connected to said combustion chamber, a header connected to the other end of said unit and communicating with said one group of flues for receiving and conducting away from said unit the gases of combustion, said header having means for receiving and conveying away any condensation occurring in said one group of flues within said unit, and means by which a fluid may be circulated through the other group of flues to effect a heat exchange with the gases of combustion in said unit, said header having an outwardly opening explosion door leading thereto and yieldingly urged into closed position.

6. A heater comprising a heat exchange unit, headers connected to opposite ends of said unit for conducting therethrough products of combustion, means connected to the one end of one of said headers for supplying thereto hot gases of combustion, an open tank disposed in close proximity to the opposite end wall of the last mentioned header, whereby the gases of combustion entering said last mentioned header will be deflected into said unit by the wall closely adjacent said tank, and the liquid in said tank will be heated by the action of the gases of combustion entering said unit.

7. In an air heater, a casing, a heat exchange unit disposed in said casing and spaced from the walls thereof, means for conducting hot gases of combustion through said unit, a tank located in said casing in a position to be heated by the hot gases of combustion which are conducted through said unit, and means arranged above said tank and extending beyond a lateral limit of said tank for directing downwardly into said tank a portion of the rising column of air adjacent said tank.

8. In an air heater, a casing, a heat exchange unit disposed in said casing and spaced from the walls thereof, means for conducting hot gases of combustion through said unit, a tank located in said casing in a position to be heated by the hot gases of combustion which are conducted through said unit, and means disposed above said tank and adjustable to project various extents beyond a lateral wall of said tank into the path of a rising column of air for diverting laterally and downwardly into said tank a portion of the rising column of air.

9. In an air heater, a casing, a heat exchange unit disposed in said casing and spaced from the walls thereof, means for conducting hot gases of combustion through said unit, a tank located in said casing in a position to be heated by the hot gases of combustion which are conducted through said unit, a stationary deflector disposed above said tank and having a convex under surface, a wing plate connected to said stationary deflector and adjustable to project various extents laterally beyond a side of the tank into the path of a rising column of hot air for directing beneath said stationary deflector a part of the rising column of air, the stationary deflector directing downwardly against the surface of the liquid in said tank, the air deflected thereto by said plate.

10. A heater comprising a casing, a metal fire box disposed in said casing largely in spaced relation to the walls thereof, a heat exchanging device connected to the top of said fire box adjacent one side of said casing, extending across the casing to a point adjacent the opposite wall thereof and therethrough said casing, said device being spaced largely from the walls of said casing, means for directing a current of air into said casing at the lower part thereof, and toward said fire box, and means connected to the upper part of said casing for removing the hot air therefrom, whereby the circulation of air through said casing and around said fire box and heat exchange device will cool said fire box and walls of the casing.

11. A heater comprising a casing, a plurality of fire box units disposed side by side in said casing, spaced largely from the walls thereof, opening through said casing, and connected to one another side to side, heat exchange devices connected to the upper part of each fire box unit, extending across the interior of said casing and having a flue discharge connection through said casing, a burner in each of said fire box units, means connected to said casing for directing into the lower part thereof and towards said fire box units a current of a fluid to be heated, means connected to the upper part of said casing for removing said fluid, and an explosion door closing the opening through the casing from said fire box units movable outwardly in its opening movement and yieldingly urged into closed position.

12. A heater comprising a casing, a combustion chamber in said casing and having an open extension through said casing, a door closing said extension, yieldingly urged into closed position across said extension and movable to open position by relatively high internal pressures in said chamber, a heat exchange device having flues connected to said chamber and extending across the interior of said casing and out of said casing, said casing having an opening in line with said flues and communicating therewith, a door covering said opening yieldingly urged into closed position, and movable to open position by high internal pressures in said flue, so as to relieve high pressures in said flues automatically.

13. A heater comprising a plurality of vertically disposed, separate sheet metal plates arranged face to face in close proximity to one another, to form thin flues, adjacent edges of the plates being connected in pairs in a manner to divide the flues into two separate groups, one group extending approximately horizontally and the other group vertically, means for conducting hot gases of combustion through the approximately horizontally extending group of flues, and means for discharging air to be heated below said plates, whereby said air may rise and pass through the vertically extending group of flues, and around said connected plates to be heated thereby.

14. A heater comprising a casing having a combustion chamber, and a flue outlet at spaced points therein, a heat exchange device within said casing and connecting said chamber and outlet, said device including a plurality of separate sheet metal plates arranged face to face in close proximity to one another to form between them relatively broad thin flues, adjacent edges of the plates being connected in pairs in a manner to divide the flues into two separate groups extending crosswise of one another, one of said groups being connected in series between said chamber and outlet, and means for circulating air through the other group of flues and around said device and chamber in said casing.

15. A heater comprising a plurality of separate vertical plates of sheet metal disposed in spaced apart face to face relation to one another to form between them a plurality of thin flues, adjacent edges of the plates being connected to one another in pairs in a manner to divide the flues into two separate groups extenidng crosswise of one another one group approximately horizontal and the other group vertical, headers connected to opposite ends of said plates and communicating with opposite ends of the group of said flues which are approximately horizontal, one of said headers having a flue discharge connection from its upper end and the other of said headers having an opening into the same in a vertical direction from below, the header end opposite said opening being closed, and a combustion chamber connected to said opening for discharging gases of combustion into said other of said headers in a vertical direction, the vertically tall and horizontal narrow flues between said plates which communicate with said other header permitting vertical expansion therein of said gases so as to equalize the flow through the flues connecting said headers.

16. In a heater, a plurality of sheet metal plates spaced apart face to face to form flues between them, adjacent edges of said plates being connected in pairs at opposite ends, in a manner to divide said flues into two groups of separate flues which extend crosswise of one another, a cross section of each of said flues being an approximate rectangle which is relatively very long and very narrow, headers arranged at opposite ends of said plates and communicating with one group of said flues, the axes of said headers being in planes which are approximately parallel to the longer of the lateral dimensions of the flues with which the headers communicate, one of said headers having an inlet at one end in an axial direction, and the other header having an outlet at the opposite end, means for supplying hot gases of combustion to said header inlet and removing them therefrom through said header outlet, and means for circulating a fluid to be heated through the other group of flues.

17. In a hot air heater, a casing, a heat exchange unit in said casing and spaced from the walls thereof, said unit having a plurality of thin gas flues extending therethrough in a direction slightly inclined to the horizontal, and a plurality of air flues extending vertically therethrough, both gas and air flues being relatively thin in cross section, a vertical header connected to the higher end of said unit for conducting to the horizontal flues thereof hot gases of combustion, means for discharging into said header hot gases of combustion, discharge connections to the other end of said unit for removing exteriorly of the casing the gases of combustion which pass through said unit, means for draining off any condensation in the gas flues from the lower end thereof and means for circulating air through said casing, around said unit and through the vertical flues thereof.

18. A heater comprising a unit having a gas conducting flue therethrough in heat interchanging relation to a surrounding medium, means for conducting through said flue hot gases of combustion, said flue extending approximately straight and horizontal with a small inclination downwardly in the direction of flow of said gases therethrough to drain from said flue in the direction of flow of said gases therethrough, any condensation occurring in said flue, whereby revaporization of any condensation in said flue will be substantially avoided.

19. A heater comprising a series of separate rectangular sheet metal plates arranged side by side and spaced apart face to face to form thin flues between them, one set of opposite edges of said plates being connected together along their entire edges in pairs and the other set of opposite edges of said plates being also connected together along their entire edges in pairs but which pairs are different from and alternate with the first mentioned pairs, whereby the flues between the adjacent plates will be alternately separate from one another, means for conducting gases of combustion through one set of said flues, and means for conducting a fluid to be heated through the other of said flues, the bottoms of the gas conducting set of flues, for some distance from the discharge end thereof being inclined downwardly in the direction of travel of the gases through that set.

20. A heater comprising a unit having a flue running approximately horizontally, means for conducting gases of combustion through said flue from end to end thereof, means for conducting a fluid in heat exchanging relation to said flue, the bottom wall of said flue being inclined downwardly in the direction of travel therethrough of the gases of combustion, whereby condensation occurring in said flue by heat exchange with said fluid will be conducted along the flue in the direction of flow therethrough of the gases of combustion, and means for draining off from the flue at the lower end thereof the collected condensation.

21. A heater comprising a set of spaced flues, extending from end to end in an approximately horizontal direction, means connected to one end of said set for conducting thereto gases of combustion, means including a header connected to the other end of said set for removing therefrom the said gases, means for conducting a fluid in heat exchanging relation to said flues, the bottom walls of said flues being inclined downwardly towards said header for draining into said header all condensation occurring in said flues, and means for removing from said header, any condensation collecting therein.

22. A heater comprising a series of separate rectangular sheet metal plates arranged side by side and spaced apart face to face to form thin flues between them, one set of opposite edges of said plates being connected together along their entire edges in pairs and the other set of opposite edges of said plates being also connected together along their entire edges in pairs, but which pairs are different from and alternate with the first mentioned pairs, whereby the flues between the adjacent plates will be alternately and completely separate from one another, means for conducting gases of combustion through one set of said flues, and means for conducting a fluid to be heated through the other of said flues, the flues of the set through which the gases of combustion pass running lengthwise in an approximately horizontal direction, with their bottom edges inclined downwardly in the direction of travel of the said gases of combustion therethrough, whereby condensation in that set of flues will drain in the direction of travel of the gases of combustion.

23. A heater comprising a source of products of combustion, a flue connected at one end to said source and progressing generally away from the heat exchanging relation to said source, said flue draining by gravity towards its outlet, means for conducting a fluid medium to be heated in heat exchanging relation to said flue in a direction approximately crosswise of the general direction of progress of said products in said flue to cause a progressive cooling of said products to a minimum temperature at the outlet end of the said flue, whereby maximum condensation from said products may be obtained, the condensate in said flue collected in the coolest zone of said flue by the assistance of gravity and the flow of said products through the flue, and substantially unheated fluid medium may reach heat exchanging relation to the coolest zone of said flue element, thereby avoiding revaporization and concentration of the condensate.

24. A heater comprising a fire box, a flue connected at one end to said fire box and progressing laterally and approximately horizontally away from said fire box, and blower means for directing a current of fluid to be heated in a direction toward said fire box and upwardly somewhat crosswise of said flue from a point remote from said fire box, whereby said fluid will strike said fire box and the under portion of the flue, and a portion of the fluid which is substantially unheated by the fire box may move upwardly into heat exchanging relation to the discharge end portion of said flue.

25. A heater comprising a source of products of combustion, a flue through which the products of combustion pass in a substantially horizontal general direction, means for causing positive movement of a fluid medium to be heated in heat exchange relation to said flue in a general direction from the coolest toward the hottest portion of said flue, the surfaces of said flue with which the products of combustion contact being so disposed that the condensate from the products of combustion is moved by gravity and the motion of the products of combustion toward the coolest portion of said flue whereby the maximum condensation of the products of combustion is obtained and revaporization and concentration of the condensate is prevented.

26. A heater comprising a source of products of combustion, a flue through which the products of combustion pass in a substantially horizontal general direction, means for causing positive movement of a fluid to be heated in heat exchange relation to said flue in a general direction from the bottom and the coolest end portion toward the top and the hottest end portion of the flue, the flue bottom having, in the zone in which condensation occurs, a pitch which directs any condensate therein into the coolest portion, whereby maximum condensation of the products of combustion is obtained and revaporization and concentration of the condensate is avoided.

27. A heater comprising a casing, a fire box in said casing adjacent one wall thereof, a heat exchange flue connected at one end to said fire box and progressing laterally across the casing away from said fire box and discharging therefrom at a point remote from said fire box, and means for directing a fluid to be heated into said casing in a direction toward said fire box and crosswise of said flue from a point remote from the fire box, whereby the said fluid will be caused to strike said fire box and said flue, and a portion of the entering fluid may move directly into heat exchanging relation to the discharge end section of said flue without being previously heated by said fire box.

28. A heater comprising a casing, a fire box in said casing adjacent one wall thereof, a heat exchange flue connected at one end to said fire box and progressing laterally across the casing away from said fire box and discharging therefrom at a point remote from said fire box, and means for directing a fluid to be heated into said casing in a direction toward said fire box and crosswise of said flue from a point remote from the fire box, whereby the said fluid will be caused to strike said fire box and said flue, and a portion of the entering fluid may move directly into heat exchanging relation to the discharge end section of said flue without being previously heated by said fire box, the portion of said flue remote from the fire box being positioned to drain any condensate therein into the coolest zone thereof and in the general direction of flow of gases in said flue.

29. A heater comprising a casing, a fire box in said casing adjacent one wall thereof, and having a discharge aperture adjacent said wall, a heat exchange flue element communicating at one end with said box through said aperture to receive products of combustion from said box, said flue element extending across and discharging said products from said casing at a point remote from said fire box, the wall of said fire box which faces said flue element diverging obliquely away from said flue element to facilitate the discharge of said products from said fire box into said flue, and provide maximum possible space between said fire box and flue element, and means opposite said fire box for directing, under pressure, a fluid to be heated into said casing towards said fire box and laterally through said space somewhat crosswise of said flue, whereby the entering fluid will reach all heated surfaces and maximum heat transfer between said products and fluid will be effected in a minimum of space.

30. A heater comprising a casing, a fire box in said casing and adjacent a wall thereof, a heat exchange flue element connected to and communicating with said fire box at a point adjacent said wall, said element extending across the casing away from said fire box and there discharging products of combustion from said casing, and means connected to said casing adjacent to the discharge end of said element for delivering into said casing, in a direction towards said fire box and beneath said flue element, a fluid to be heated, whereby a portion of said fluid will strike and be heated by the fire box and another and unheated portion will pass directly somewhat crosswise of said flue element in heat exchanging relation thereto, said casing having an outlet in its upper portion through which the heated fluid may be removed from the casing.

31. A heater comprising a casing, a fire box in said casing and adjacent a wall thereof, a heat exchange flue element connected to and communicating with said fire box at a point adjacent said wall, said element extending across the casing away from said fire box and there discharging products of combustion from said casing, means connected to said casing adjacent to the discharge end of said element for delivering into said casing, in a direction towards said fire box and beneath said flue element, a fluid to be heated, whereby a portion of said fluid will strike and be heated by the fire box and another and unheated portion will pass directly somewhat crosswise of said flue element in heat exchanging relation thereto, said casing having an outlet in its upper portion through which the heated fluid may be removed from the casing, the bottom of said flue element having sufficient pitch to drain any condensate therein by gravity in the general direction of flow of the products of combustion through said flue element into the coolest zone of said element, whereby revaporization and concentration of the condensate is prevented.

32. A heater comprising a casing, a fire box in said casing having a discharge aperture, a heat exchange flue element communicating at one end with said box through said aperture and having a passage ascending from said aperture and then progressing laterally away from said fire box and discharging products of combustion from said casing, a water pan disposed in close proximity to a wall of said element at said ascending passage, whereby the water in said pan will be heated by the hot products of combustion leaving said fire box, and means for circulating air through said casing for heat exchange with said fire box and flue element and to receive moisture from said pan.

33. A heater comprising a casing, a fire box in said casing having a discharge aperture, a heat exchange flue element communicating at one end with said box through said aperture and having a passage ascending from said aperture and then progressing laterally away from said fire box and discharging products of combustion from said casing, the walls of the ascending section of said passage adjacent its upper end and opposite the laterally extending section being oblique to deflect the products of combustion from said ascending section into the other section, a water pan fitted in proximity to said oblique wall to be heated thereby, and means for circulating air through said casing for heat exchange with said fire box and flue element and to receive moisture from said pan.

34. A heater comprising a casing, a fire box in said casing adjacent one wall thereof, and having a discharge aperture adjacent said wall, a heat exchange flue element communicating at one end with said box through said aperture to receive products of combustion from said box, said flue element extending across and discharging said products from said casing at a point remote from said fire box, the wall of said fire box which faces said flue element diverging obliquely away from said flue element to facilitate the discharge of said products from said fire box into said flue, and provide maximum possible space between said fire box and flue element, and means opposite said fire box for directing, under pressure, a fluid to be heated into said casing towards said fire box and laterally through said space somewhat crosswise of said flue, whereby the entering fluid will reach all heated surfaces and maximum heat transfer between said products and fluid will be effected in a minimum of space, said flue being constructed to drain any condensate forming therein generally in the direction of flow of said products therein into the coolest section thereof.

WILLIAM J. GAMBLE.
ALFRED E. STACEY, Jr.
WILLIAM B. THORNTON.